United States Patent [19]

Champa et al.

[11] Patent Number: 4,770,491
[45] Date of Patent: Sep. 13, 1988

[54] DEAD END FOR FIBER OPTIC SHIELD CABLE

[75] Inventors: Raymond J. Champa, Bainbridge; Thomas E. Sherman, Chagrin Falls, both of Ohio

[73] Assignee: Preformed Line Products Company, Cleveland, Ohio

[21] Appl. No.: 864,801

[22] Filed: May 19, 1986

[51] Int. Cl.$^4$ .............................................. G02B 6/44
[52] U.S. Cl. .................... 350/96.23; 174/79; 254/134.3 R
[58] Field of Search ........................ 350/96.23; 174/79; 254/134.3 R

[56] References Cited

U.S. PATENT DOCUMENTS

| | | | |
|---|---|---|---|
| 2,913,791 | 11/1959 | Martin | 174/79 |
| 3,002,046 | 9/1961 | Clapper | 174/79 |
| 3,137,765 | 6/1964 | Lanum | 254/134.3 R X |
| 3,306,970 | 2/1967 | Kowalski | 174/79 |
| 3,522,961 | 8/1970 | Cave, Sr. et al. | 174/79 |
| 3,739,457 | 6/1973 | Davis | 29/460 |
| 3,775,811 | 12/1973 | Smrekar et al. | 24/122.6 |
| 3,960,461 | 6/1976 | Sachs | 403/368 |
| 4,066,368 | 1/1978 | Mastalski et al. | 403/211 |
| 4,189,620 | 2/1980 | Stange | 174/79 |
| 4,279,466 | 7/1981 | Makuch et al. | 350/96.22 |
| 4,428,100 | 1/1984 | Apperson | 24/115 R |
| 4,447,120 | 5/1984 | Borsuk | 350/96.20 |
| 4,459,722 | 7/1984 | Dziedzic et al. | 24/122.6 |
| 4,460,159 | 7/1984 | Charlebois et al. | 350/96.23 X |
| 4,496,212 | 1/1985 | Harvey | 350/96.20 |
| 4,516,830 | 5/1985 | Guazzo | 350/96.22 |
| 4,645,867 | 2/1987 | Annas | 174/79 |
| 4,684,211 | 8/1987 | Weber et al. | 254/134.3 R X |

Primary Examiner—John Lee
Assistant Examiner—Phan Heartney
Attorney, Agent, or Firm—Fay, Sharpe, Beall, Fagan, Minnich & McKee

[57] ABSTRACT

A dead end appliance for a fiber optic cable includes a housing having an elongated opening therethrough. The elongated opening is angularly disposed with respect to a longitudinal axis of the housing and opposite to the lay angle of helical retaining rods surrounding the cable. This conformation assures full capture of the retaining rods within the housing. Strengthening ribs for the housing are disposed substantially normal to the housing longitudinal axis. Additionally, means for grounding the assembly is integrally formed with the housing, and either a U-shaped member or a pair of clevis members may be used for attaching the housing to an associated support.

25 Claims, 3 Drawing Sheets

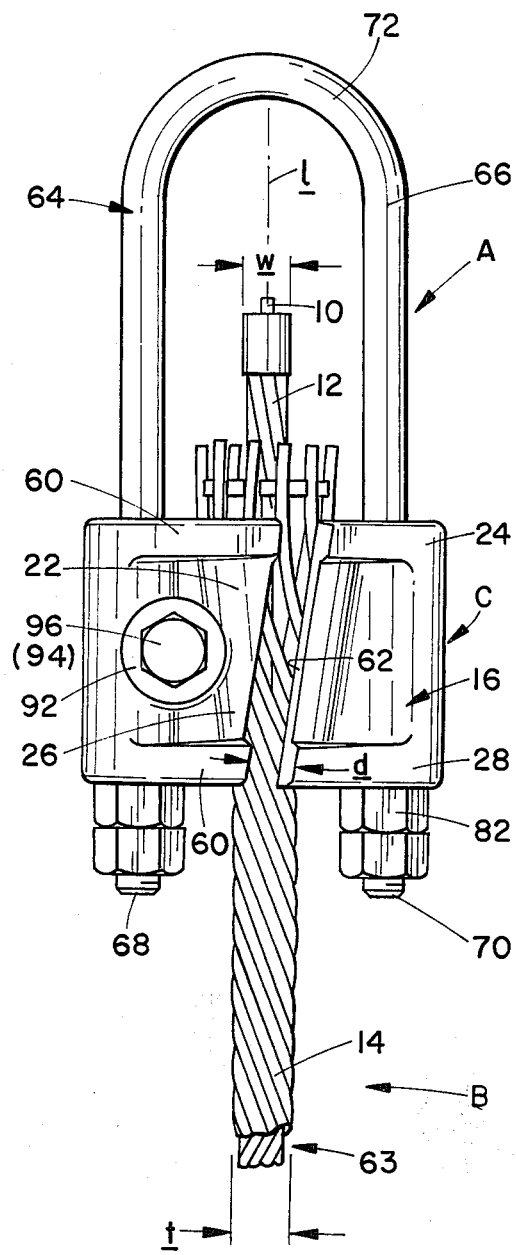
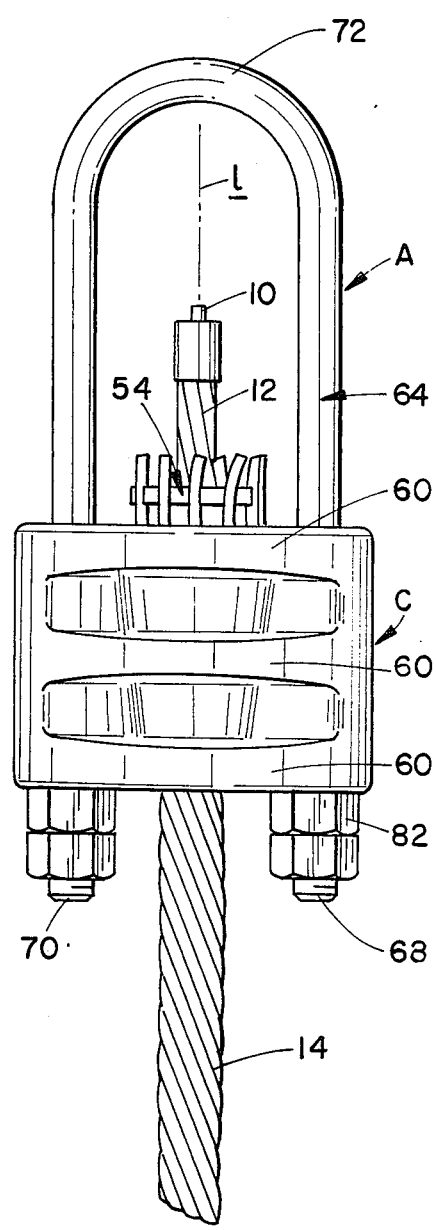

DEAD END FOR FIBER OPTIC SHIELD CABLE

BACKGROUND OF THE INVENTION

This invention pertains to the art of a termination or dead end appliance for a load bearing cable or the like and, more particularly, such an appliance for use with fiber optic cables. The invention is particularly applicable to a fiber optic cable employing helically-formed gripping members along its load bearing length and will be described with particular reference thereto. However, it will be appreciated that the invention has broader applications and may be advantageously employed in other cable environments.

Prior art dead end devices typically incorporate a pair of interracting members that exert a tensile stress on a supported cable. By way of example, the commonly assigned U.S. Pat. No. 3,775,811 to Smrekar, et al., issued Dec. 4, 1973, illustrates one such prior art device having a wedge member disposed between a cable and helical gripping members. The wedge member cooperates with a tapered bore of a surrounding housing to provide a secure dead end arrangement for the cable and surrounding gripping members. This type of construction has been found wholly satisfactory and advantageous for use with conventional cable, conductors, and the like.

The advent of fiber optic technology has presented a need for satisfactorily dead ending a fiber optic cable. Fiber optic cables present specialized problems not encountered in other wire cable dead end constructions. Specifically, glass fiber cannot be exposed to extreme radial compressive forces. Therefore, in an effort to prevent damage to the glass fibers, a dead end device used in this environment must distribute the radial compressive loading over a predetermined axial area or section of the fibers.

One disadvantage encountered with the closed housing dead end illustrated in the above-noted patent is the requirement that the dead end housing be threaded over the fiber optic cable at each dead end location. These lengths can be rather substantial, and the installation process is generally quite tedious and cumbersome for an installer. As an alternative, the cable must be cut at each dead end location. This approach really is not practical since cutting the fiber optic cable and incorporating a splice case with connectors is expensive and time consuming.

Therefore, it has been considered desirable to provide an open ended housing that permits a secure dead end arrangement for fiber optic cables. The subject invention is deemed to meet these needs and others, and successfully overcome the above-noted deficiencies in the prior art.

SUMMARY OF THE INVENTION

In accordance with the invention, the subject new dead end assembly includes a cable supported by a plurality of helical retaining rods cooperating with a frusto-conical member disposed therebetween. A housing includes a frusto-conical bore extending longitudinally therethrough cooperable with the frusto-conical member. The housing also includes an elongated receiving slot or opening angularly disposed with respect to the housing longitudinal axis and communicating between the exterior of the housing and frusto-conical bore for receiving the cable therethrough. A U-bolt or clevis and pin arrangement extends from the housing to an associated support.

In accordance with another aspect of the invention, strengthening ribs are formed in the housing to extend in a direction substantially normal to the housing longitudinal axis.

According to a further aspect of the invention, the dead end assembly includes an electrical ground connection integrally formed in the housing.

According to yet another aspect of the invention, the receiving slot or opening in the housing is angularly disposed opposite to the helical winding or lay direction of the retaining rods.

In accordance with a still further aspect of the invention, the slot or opening has a predetermined width less than the combined width of the cable and retaining rods.

The principal advantage of the present invention is the provision of a secure dead end arrangement for a fiber optic cable.

Another advantage of the invention resides in the ease with which the dead end housing may be secured over the cable.

A further advantage of the invention is found in the use of an integrally formed electrical grounding connection.

Still other advantages and benefits of the invention will become apparent to those skilled in the art upon a reading and understanding of the following detailed specification.

BRIEF DESCRIPTION OF THE DRAWINGS

The invention may take physical form in certain parts and arrangement of parts, preferred and alternative embodiments of which will be described in detail in this specification and illustrated in the accompanying drawings which form a part hereof and wherein:

FIG. 1 is a front elevational view of the subject invention dead ending a fiber optic cable or the like;

FIG. 3 is a rear elevational view of the dead end assembly shown in FIG. 1;

DETAILED DESCRIPTION OF THE PREFERRED EMBODIMENT

Figure 2:
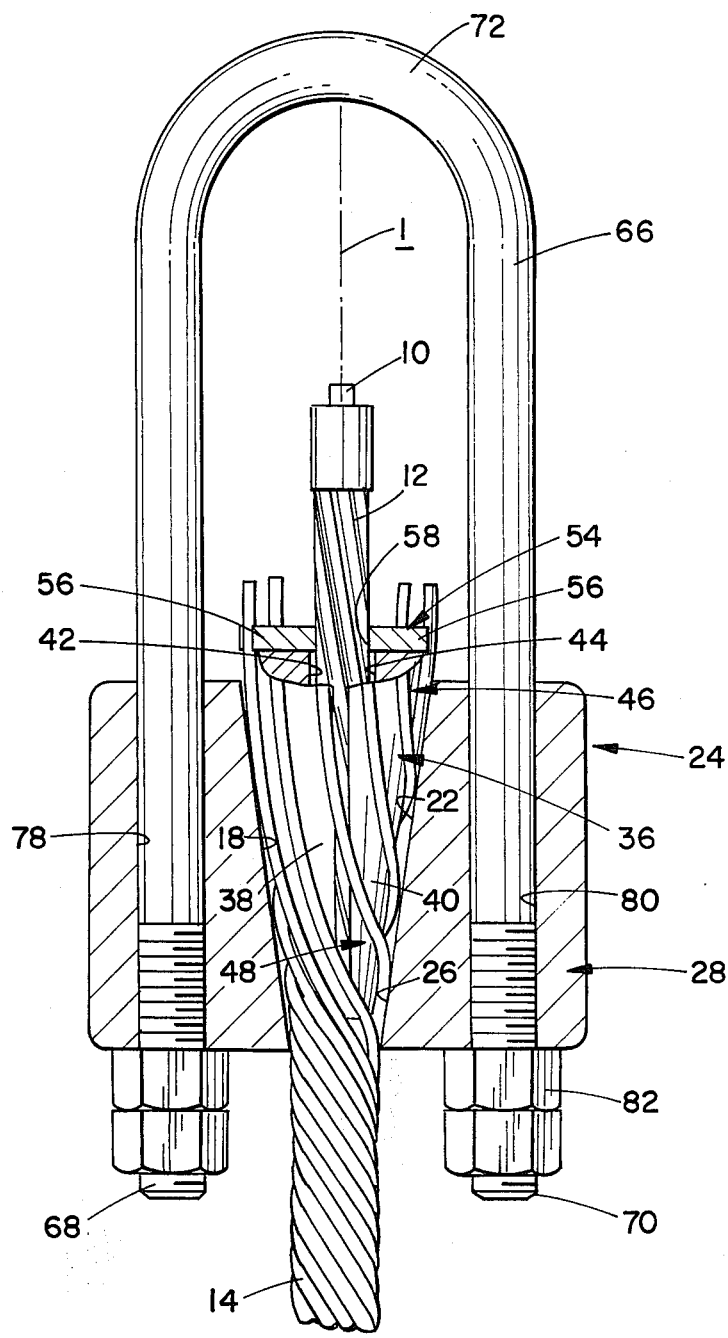
FIG. 2 is a slightly enlarged view similar to the showing of FIG. 1 with selected portions being in cross section for ease of illustration.

Referring now to the drawings wherein the showings are for purposes of illustrating preferred and alternative embodiments of the invention only and not for purposes of limiting same, FIGS. 1–3 show a dead end assembly A designed for use with a terminal end of a fiber optic cable B or the like.

More specifically, the fiber optic cable includes a central fiber assembly 10 that is normally formed from glass fibers or similar material and is adapted to transmit light pulses between a light source and a receiver. The fibers may be flexible or semi-rigid depending on the material of construction, and are oftentimes formed from multi-component glass that returns the light toward the core through total internal reflection or, alternatively, bends the light to refocus it about the center axis of the fiber core. Further details of the fiber construction are deemed unnecessary to a full and complete understanding of the subject invention.

A protective sheathing or covering 12 circumferentially surrounds the fiber optic cable or bundle. Typically, the sheathing is constructed from metal or similar armor material to protect the fragile optic fibers from imposed stresses. The combination of the optic fibers and sheathing will be hereinafter referred to as the "fiber optic cable".

Plural gripping members or retaining rods 14 are spirally or helically wound in tight, circumferential gripping relation with the fiber optic cable. Preferably, the retaining rods have a helical configuration that distributes stresses over a predetermined length of the cable. The helical conformation of the retaining rods exerts axial and circumferential stresses on the cable, and the rods are helically dimensioned to provide an inner diameter slightly smaller than the outer diameter of the fiber optic cable. The material from which the rods are constructed is sufficiently resilient to provide a tight gripping relation with the circumference of the fiber optic cable. Approximately three or four individual ones of the retaining rods form a coacting group, and plural groups circumferentially surround the fiber optic cable. As illustrated in FIGS. 1-3, the retaining rods define a left-hand helix or left lay, although it is understood that a right-hand helix or right lay may be used with equal success.

One end of the fiber optic cable is received in a housing assembly C that includes a housing 16 having a generally elliptical periphery and a longitudinal axis 1. Although other materials could be employed in the embodiment here under discussion, the housing is formed of cast iron that is hot dip galvanized for corrosion protection. Housing 16 includes a tapered or frusto-conical bore 18 coaxial with axis 1. The bore has a large diameter end portion 22 at a first or upper end 24 of the housing, and a small diameter end portion 26 at a second or lower end 28 of the housing. The small diameter end portion is dimensioned to receive the fiber optic cable with the retaining rods therethrough. This dimensional relationship will be explained in more detail hereinbelow.

With particular reference to FIG. 2, a wedge-shaped protuberance or frusto-conical member 36 is positioned between the fiber optic cable 10, 12 and the retaining rods 14. The frusto-conical member is comprised of first and second generally hemispherical portions 38, 40, which have longitudinally extending, arcuate grooves 42, 44, respectively in the opposed facing surfaces thereof. When the frusto-conical portions 38, 40 are placed in the mating relationship shown in FIG. 2, the arcuate grooves form a receiving passage or throughbore adapted to closely receive the fiber optic cable. The frusto-conical member 36 has a first large diameter end 46 and a second small diameter end 48. The conformation of the frusto-conical member is such that it is adapted for close receipt within the frusto-conical bore 18 of the housing.

An annular flange 54 includes plural axially oriented recesses 56 equidistantly spaced about the flange outer periphery. These recesses are adapted to receive respective ones of the retaining rods 14 adjacent their terminal ends as will become apparent. The flange has a diameter which is greater than the large diameter end 46 of the frusto-conical member, and is adapted for abutting engagement therewith. A central opening 58 extends through the flange and is adapted to closely receive the fiber optic cable therethrough. The flange may comprise a single integral member, or a pair of cooperating halves facilitating mounting with the frusto-conical member. Alternatively, the flange may be formed integrally with the frusto-conical portions 38, 40.

As previously described, the retaining rods 14 are designed to circumferentially grip the fiber optic cable and are resiliently deformable to receive the frusto-conical member 36 adjacent the rod terminal ends. Each recess 56 in the flange 54 receives one of rods 14 so that the rods are equally spaced about the frusto-conical member. The increasing diameter provided over the length of the frusto-conical member from end 48 to end 46 varies the helical angle of the retaining rods about the fiber optic cable, and the fiber optic cable, rotaining rods, and frusto-conical member function as a unitary assembly.

The housing 16 includes plural ribs 60 at axially spaced intervals therealong. These ribs extend generally normal to the longitudinal axis of the housing and provide for increased housing strength. As illustrated in FIG. 3, three generally equidistantly spaced apart ribs are contemplated for use in the preferred embodiment. The upper and lower ribs extend the full circumference of the housing while the central rib extends only along the housing rear surface. Ribs 60 add appropriate bulk or supportive structure required to maintain the degree of housing strength necessary in view of the inclusion of a cable receiving slot in the side wall thereof as will be described in detail below. Of course, it will be appreciated that other numbers of and arrangements for the ribs could also be satisfactorily employed.

Additionally, and as best shown in FIG. 1, the housing includes an elongated receiving slot or opening 62 penetrating the housing side wall into communication with bore 18 and being angularly disposed with respect to the longitudinal axis 1. The opening 62 extends from the housing first end 24 at an area thereof disposed on the left-hand side of axis 1 to the housing second end 28 where the opening is positioned on the right hand side of the axis. This angular orientation of the elongated opening with respect to the housing axis provides for full capture of the retaining rods within the housing. "Full capture" is a coined term as defined below for describing the relationship between the retaining rods 14 and the housing C, specifically, the elongated opening 62.

As best illustrated in FIG. 2, and as described above, the retaining rods 14 are angularly disposed from the right-hand portion toward the left-hand portion as the rods helically advance along fiber optic cable 10, 12 toward the lower end of the dead end assembly at housing second end 28. In other words, the retaining rods define a left-hand helix or left lay. The elongated opening 62 is angled in the opposite direction to the lay direction of the retaining rods such that at least a portion of each rod is captured within the housing. That is, the elongated opening follows a generally right-hand helix or right lay. In this manner, the receiving slot is designed to cross over the retaining rods. The axially extending lengths of the retaining rods helically rotate about the axis of the fiber optic cable which, in turn, is generally coaxial with the longitudinal axis 1 of the housing as shown in the FIGURES. If the elongated opening was coincidental with the longitudinal axis, or, alternatively, coincidental with the lay direction of the retaining rods, one or more of the retaining rods would possibly not be constrained by the inner wall of the frusto-conical bore 18. By positioning the elongated opening at a lay angle opposite to that of the retaining rods, full capture of the rods within the housing is assured. Of course it is understood that if the retaining rods are disposed in a right lay direction then the receiving slot 62 would, in turn, define a left lay opposite the retaining rods to maintain full capture.

The elongated receiving opening 62 is of a generally constant, predetermined width d which is less than the combined width t of the retaining rods in gripping engagement with the fiber optic cable 10, 12. The predetermined width d, though, is greater than the width w of the fiber optic cable. These dimensional relationships permit the fiber optic cable to pass through the elongated opening at an area remote from the retaining rods in a manner to be described.

In dead ending a fiber optic cable using the subject new appliance, the frusto-conical member 36 is first placed around the cable 10, 12. Next, the helical retaining rods 14 are wrapped in circumferential gripping engagement with the cable and frusto-conical member 36. In prior art constructions, the housing was necessarily threaded onto the cable prior to wrapping the retaining rods thereon, or the housing was threaded over great lengths to the dead end assembly, or the cable was cut and spliced to accommodate the housing. With the subject new assembly, however, the housing is slipped onto the fiber optic cable through elongated opening 62 at, for example, an area generally designated 63 spaced a short distance forwardly of the forward terminal ends of rods 14. Thereafter, the housing is threaded a short distance over the fiber optic cable and retaining rods for engagement with the frusto-conical member in a known manner.

According to the present invention the fiber optic cable, which cannot withstand radial loads without possible damage to the optical fibers, does not have to support the housing while the frusto-conical member and retaining rods are situated thereon. Instead, the frusto-conical member 36 and helical rods 14 are positioned on the fiber optic cable without any concern for the housing 16. The housing is then slipped onto the cable at area 63 as described.

The housing assembly C includes attaching means generally designated 64 extending outwardly from the housing first end 24. The embodiment of FIGS. 1-3 has an attaching means which includes a generally U-shaped member 66 having substantially parallel terminal portions 68, 70. A rounded end or apex 72 is adapted for engagement with an associated support (not shown) as is known, while the outer terminal end portions 68, 70 are received through respective axial apertures 78, 80 in the housing. Convenient fastening means 82 such as nuts, lock nuts, or the like, are received on end portions 68, 70 for retaining attaching means 64 in housing C.

The housing assembly C also includes means 92 for electrically grounding the dead end assembly. This grounding means is disposed generally normal to aperture 78. The grounding mechanism provides current transfer through the dead end housing and is comprised of a threaded aperture 94 in the housing that cooperatively receives a threaded fastener 96 or the like.

The threads of the grounding means are coated with a conductive rust inhibitor to promote extended life. One skilled in the art will realize that suitable alternative materials may be used with equal success. This structure provides a simplified manner of grounding the assembly without disturbing the mounting or connection for attaching means 64 in the embodiment of FIGS. 1-3.

Figure 6:
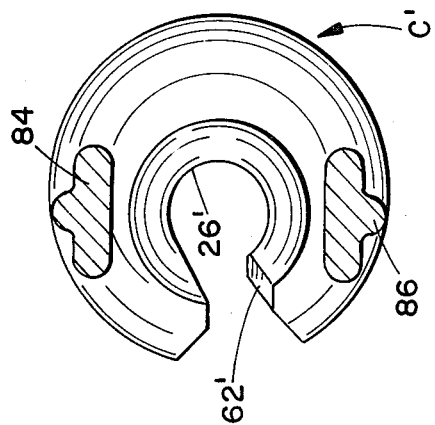
Figure 4:
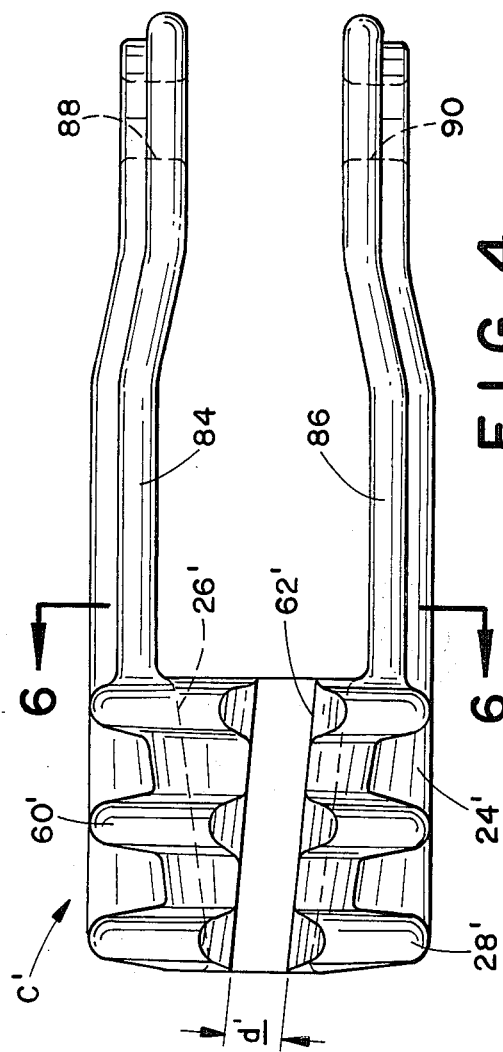
FIG. 4 is a front elevational view of an alternate dead end assembly formed in accordance with the subject invention.
Figure 5:
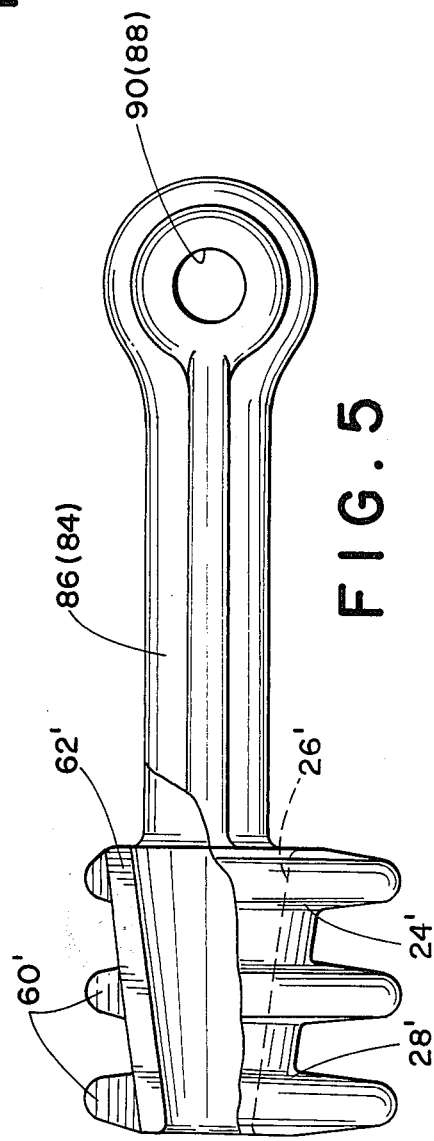
FIG. 5 is a side elevational view of the arrangement shown in FIG. 4 with selected portions thereof cut away for ease of illustration; and, FIG. 6 is a cross-sectional view taken generally along lines 6—6 of FIG. 4.

With reference to FIGS. 4-6, an alternative attaching means structure is illustrated. In these FIGURES, like components are identified by like numerals will a primed (') suffix and new components are identified by new numerals. As shown, a pair of spaced apart, generally parallel clevis members 84, 86 extend outwardly from the housing first end 24'. Preferably, the clevis members 84, 86 are integrally cast with the housing. Each clevis member includes an opening 88, 90 at its outer end adapted to receive a pin member or the like (not shown) for retaining engagement with an associated support (not shown). The remaining structure of this alternative embodiment as well as its operation and use are substantially identical to that described with reference to the FIGS. 1-3 embodiment. This includes incorporation of grounding means 92.

The invention has been described with reference to the preferred embodiments. Obviously, modifications and alterations will occur to others upon a reading and understanding of this specification. It is intended to include all such modifications and alterations insofar as they come within the scope of the appended claims or the equivalents thereof.

Having thus described the invention, it is now claimed:

1. An apparatus adapted for dead ending an associated cable having a first predetermined diameter, the associated cable including gripping members circumferentially disposed thereon and defining a second predetermined diameter, and the associated cable further including a generally frusto-conical member interposed between a portion of the gripping members and cable, said apparatus comprising:
   a housing;
   means for matingly receiving an associated cable and frusto-conical member in said housing;
   a cable receiving slot extending through a sidewall of said housing for operative communication with said receiving means; and,
   means adapted for mounting said housing to an associated support structure.

2. The apparatus as defined in claim 1 wherein said cable receiving slot has a width greater than the associated cable first predetermined diameter and less than the second predetermined diameter defined by the associated cable and gripping member.

3. The apparatus as defined in claim 1 wherein said cable receiving slot is configured to fully capture associated gripping members therein.

4. The apparatus as defined in claim 1 wherein said cable receiving slot is disposed in a lay direction generally opposite an associated gripping member lay direction.

5. The apparatus as defined in claim 1 further comprising strengthening means on said housing.

6. The apparatus as defined in claim 1 wherein said mounting means includes a generally U-shaped member having a pair of outer terminal ends operatively engaging said housing.

7. The apparatus as defined in claim 1 wherein said mounting means includes at least one clevis member extending outwardly from said housing.

8. The apparatus as defined in claim 1 further including means for grounding said apparatus.

9. An appliance adapted for securing a cable adjacent a first terminal end thereof, said appliance comprising:
   a frusto-conical member having a through-bore extending axially thereof between a large diameter rear end and a small diameter forward end, said through-bore adapted to closely receive an associated cable therethrough adjacent a cable terminal end;
   a plurality of retaining rods helically surrounding a portion of an associated cable forwardly of said frusto-conical member forward end and helically surrounding the exterior of said frusto-conical member from said forward end to said rear end;
   a housing having a longitudinal axis and a frusto-conical bore extending coaxially therethrough from a first end to a second end, said bore being dimensioned for mating receipt of said frusto-conical member, said housing further including an elongated cable receiving opening penetrating a side wall of said housing into communication with said frusto-conical bore, said opening extending from said housing first end to said housing second end generally along said longitudinal axis and being angularly disposed with respect to said longitudinal axis, said opening having a predetermined width between spaced apart sides thereof coordinated to the cross-sectional dimension of a cable with which said housing is adapted to be associated; and,
   means adapted to attach said housing to an associated support.

10. The appliance as defined in claim 9 further comprising strengthening means formed along said housing.

11. The appliance as defined in claim 9 further comprising an electrical ground connection formed in said housing.

12. The appliance as defined in claim 9 wherein said retaining rods define a first lay angle with respect to said longitudinal axis and said cable receiving opening defines a second lay angle generally opposite to said retaining rods to fully capture said rods within said housing.

13. The appliance as defined in claim 9 wherein said frusto-conical member has a flange at one end for capturing said retaining rods along a periphery thereof.

14. The appliance as defined in claim 9 wherein said housing frusto-conical bore has a minimum diameter adjacent said housing first end, said minimum diameter being greater than a width dimension of said elongated opening.

15. The appliance as defined in claim 9 wherein said cable is of fiber optic construction.

16. An appliance adapted for securing an associated cable having a predetermined cross-sectional dimension w, said appliance including a protuberance adapted to be fixedly secured to the associated cable to extend axially along a section thereof, plural retaining rods closely helically wrapped in a first lay direction around an associated cable to a cross-sectional dimension t from an area thereof axially spaced a predetermined distance from a forward end of said protuberance and being spirally wrapped around said protuberance from said forward end to a rear end thereof, an appliance housing having a bore extending therethrough between opposed housing end areas and being conformed for generally matingly receiving and retaining said protuberance and the portion of said rods spirally wrapped therearound, said housing including a cable receiving slot in a sidewall thereof extending between said housing end areas and communicating with said bore, said slot having a second lay direction generally opposite to said first lay direction and having a width d greater than w and less than t, and means adapted for mounting said housing to an associated support structure.

17. The appliance as defined in claim 16 further comprising strengthening ribs disposed on said housing.

18. The appliance as defined in claim 16 further comprising means operatively engaged to said housing for electrically grounding the appliance.

19. A dead end assembly comprising:
   an elongated fiber optic cable having a terminal end;
   a plurality of retaining rods for helically gripping a peripheral portion of said fiber optic cable;
   a generally frusto-conical member having a bore extending therethrough, said bore adapted to closely receive said fiber optic cable therein, said frusto-conical member disposed between said fiber optic cable and said retaining rods;
   a housing having a generally frusto-conical bore formed along a longitudinal axis and adapted to closely receive said frusto-conical member therein, said housing including an elongated cable receiving opening in a sidewall thereof and angularly disposed with respect to said longitudinal axis and adapted to receive said fiber optic cable therethrough, said elongated opening contiguous with said frusto-conical bore; and,
   means for fastening said housing to an associated support.

20. The dead end assembly as defined in claim 19 wherein said retaining rods are helically rotated about said longitudinal axis in a first lay direction and said cable receiving opening is generally disposed in a second lay direction about said longitudinal axis and generally opposite to said first lay direction whereby said retaining rods are fully captured within said housing.

21. The dead end assembly as defined in claim 19 wherein said cable receiving opening has a first predetermined width less than a minimum diameter of said frusto-conical bore.

22. The dead end assembly as defined in claim 19 wherein said fastening means includes a pair of clevis members extending outwardly from one end of said housing.

23. The dead end assembly as defined in claim 19 wherein said fastening means includes a pair of apertures extending through said housing generally parallel to said longitudinal axis, said apertures adapted to closely receive respective outer ends of a U-shaped member, a closed end of said U-shaped member adapted for engaging relation with an associated support.

24. The dead end assembly as defined in claim 19 further including means disposed in said housing for electrically grounding the dead end assembly.

25. The dead end assembly as defined in claim 19 further comprising strengthening ribs extending circumferentially around said housing in a direction generally normal to said longitudinal axis.

* * * * *